US012812547B2

(12) United States Patent
Schiegg et al.

(10) Patent No.: US 12,812,547 B2
(45) Date of Patent: Nov. 24, 2026

(54) METHODS AND APPARATUSES FOR RADIO COMMUNICATION

(71) Applicant: Robert Bosch GmbH, Stuttgart (DE)

(72) Inventors: Florian Alexander Schiegg, Hildesheim (DE); Khaled Shawky Hassan, Sarstedt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 528 days.

(21) Appl. No.: 18/171,952

(22) Filed: Feb. 21, 2023

(65) Prior Publication Data

US 2024/0284338 A1 Aug. 22, 2024

(51) Int. Cl.
*H04W 52/02* (2009.01)

(52) U.S. Cl.
CPC ... *H04W 52/0274* (2013.01); *H04W 52/0232* (2013.01)

(58) Field of Classification Search
CPC ...................... H04W 52/0274; H04W 52/0232
USPC .......................................................... 370/318
See application file for complete search history.

(56) References Cited

U.S. PATENT DOCUMENTS

2020/0169956 A1* 5/2020 Sun ....................... H04W 72/04
2021/0059004 A1 2/2021 Wu et al.
2022/0210867 A1* 6/2022 Bergström ............ H04L 1/1829
2024/0196363 A1* 6/2024 Zorgui .................. H04W 72/51
2024/0356791 A1* 10/2024 Chen ................... H04L 27/2626
2025/0056571 A1* 2/2025 Zhang ................... H04W 72/25
2025/0071522 A1* 2/2025 Zhang ................... H04W 4/029
2025/0184950 A1* 6/2025 Pan ................... H04W 52/0216
2025/0220390 A1* 7/2025 Kalhan ................. G01S 5/0018

FOREIGN PATENT DOCUMENTS

WO 2016048509 A1 3/2016
WO 2021119474 A1 6/2021
WO 2021141404 A1 7/2021

OTHER PUBLICATIONS

Robert Bosch GmbH: "Rel-18 Sidelink Enhancements for Verticals", 3GPP TSG-RAN Rel-18 workshop; RWS-210217, 3rd Generation Partnership Project (3GPP), Mobile Competence Centre; 650, Route Des Lucioles; F-06921 Sophia-Antipolis Cedex; France vol. TSG RAN, No. Electronic Meeting; (2021), XP052025775, pp. 1-5.

* cited by examiner

*Primary Examiner* — Faisal Choudhury
(74) *Attorney, Agent, or Firm* — NORTON ROSE FULBRIGHT US LLP

(57) ABSTRACT

A method comprising: deactivating a sleeping mode of an apparatus; transmitting, after deactivation of the sleeping mode, a position information, if an associated contribution indicator indicates that the position information is suited to contribute to the determination of an position of at least one another apparatus; and activating, after the transmission of the position information, the sleeping mode.

23 Claims, 9 Drawing Sheets

METHODS AND APPARATUSES FOR RADIO COMMUNICATION

CROSS REFERENCE

European Patent Application No. EP 21 20 8956.9 filed on Nov. 18, 2021 is expressly incorporated herein by reference in its entirety.

FIELD

The present application concerns advantages in radio communication.

SUMMARY

The problems of the related art may be solved by certain features of a method according to present invention, by at least one apparatus of present invention, and by at least one further method according to the present invention.

An aspect of the present invention is directed to the following subject matter: A method comprising: deactivating a sleeping mode of an apparatus; transmitting, after deactivation of the sleeping mode, a position information, if an associated contribution indicator indicates that the position information is suited to contribute to the determination of a position of at least one another apparatus; and activating, after the transmission of the position information, the sleeping mode.

Advantageously, waking up sleeping parked vehicles is used as a precise positioning enhancer using sidelink positioning. Parked vehicles wake up, adapt and provide their positioning, and then assist other vehicle to compute/enhance computing their positioning using sidelink positioning. Advantageously, power saving is enabled and wake-up is handled carefully and in timely manner to allow sufficient wakeup period and allow SL positioning measurement.

Advantageously, a waking up strategy for sidelink positioning evaluation is provided that enables better power saving. In particular, parked vehicles can assists moving vehicles by the transmitted position information while at the same time, power saving is provided by the sleeping mode.

An advantageous example embodiment of the present invention includes updating, after deactivation of the sleeping mode, the position information and the associated contribution indicator if the contribution indicator indicates that the position information is not suited to contribute to the determination of the position of the at least one another apparatus.

For example, the contribution indicator is controlling lower layers indicating sufficient triggering to wake up a sleeping receiver, i.e., combined with other metrics. However, setting up the contribution indicator can involve higher layers, especially when the spatial position (X, Y, Z) is compared with a confident value. This means, the contribution of satellite positions, CLM containers, and received ranging/angles from higher layers is analyzed. This can be done in higher layers. Hence, higher layers compute values for the contribution indicator, set the contribution indicator to one of levels it may take, and then, it sends the contribution indicator to lower layers to control wake-up procedure for position accuracy enhancements.

Advantageously, an update is triggered if the contribution of transmitting the location information is expected to be low. In other words, precise positioning adaption is conducted, once a UE wakes up, which enhances the position information of the UE.

In an advantageous example embodiment of the present invention, the updating of the position information and the associated contribution indicator is based on at least one or more of the following: at least one remote position information, which characterizes a spatial position of another apparatus, and which has been received; at least one satellite information, which characterizes at least a signal propagation delay between a satellite and the apparatus, and which has been received; and at least one distance information, which characterizes the relative distance between the apparatus and another apparatus.

An advantageous example embodiment of the present invention includes receiving or determining or reading a wakeup pattern characterizing at least a plurality of time instants, at which at least a receiver circuit is woke-up; the sleep mode is deactivated, if the wakeup pattern indicates an end of the sleep mode.

An advantageous example embodiment of the present invention is characterized in receiving or determining or reading a wakeup opportunity pattern characterizing at least a plurality of time periods, at which at least the receiver circuit is awake; monitoring during at least one of the time periods a radio channel for a reception of a wakeup indication or signaling; and the sleep mode is deactivated, if the wakeup signal is received during the at least one time period, or activating the sleep mode, if no wakeup indication or signaling is received during the at least one time period.

In an advantageous example embodiment of the present invention, the receiving of the at least one wakeup signal comprises a transmission request.

An advantageous example embodiment of the present invention includes receiving at least one wakeup signal (WUS #1), wherein the wakeup signal itself or a following signal comprises a transmission request (TxR), wherein the transmission request comprises a sidelink positioning request signaling, wherein the sidelink positioning request signalling is used by the receiver to measure the physical distance range between the said receiver and the transmitter transmitting the sidelink positioning request.

Advantageously, the apparatus (the receiver of such a sidelink positioning request) is triggered to measure, by means of physically measuring the time-of-fly (ToF) and/or angle-of-arrival/departure (AoS/AoD) and/or Phase and Amplitude Change (PAC) of the sidelink positioning request signal, the distance range and/or the position angle between the said receiver apparatus and the transmitter node transmitting the said sidelink positioning request during a wake-up time.

Advantageously, the apparatus (the receiver of such a sidelink positioning request) may be triggered to transmit a response to the sidelink positioning transmission request; wherein the response incorporates the sidelink distance range and/or the position angle between the transmitter of the request and the said receiver, wherein the values are incorporated in the physical transmission waveform or in lower layer messages during a wake-up time.

In an advantageous example, the receiver that receives the sidelink positioning request from a transmitter is measuring the range and the angle to the said transmitter, where in the receiver is sending the measured values during the wakeup time to its upper layers to enhance the positioning to the said transmitter.

Advantageously, the apparatus may be triggered by the transmitted transmission request to transmit the position information in its vicinity.

An advantageous example embodiment of the present invention includes receiving at least one further wakeup signal that comprises an update request, wherein the updating of the position information and the associated contribution indicator is conducted upon receiving the update request.

Advantageously, the apparatus may be triggered by the transmitted update request to update its own location information. Therefore, a managed mode for the UE is provided.

According to an example embodiment of the present invention, a lower layer update request is a sidelink positioning request which is the sidelink message/signaling contains the sidelink positioning reference symbols (SPRS).

According to an example embodiment of the present invention, a higher layer update request, which when the UE is awake and wakes up its computer/GPP, the UE receives an CLM message or CLM update request, which are needing replies from higher layer signaling. In the latter case, the RX/TX are awake and ready for responding back carrying those higher layer messages with their (the RX/TX's) lower layer mechanisms In an advantageous example embodiment of the present invention, the deactivating of the sleep mode is based on at least one of the following: the contribution indicator; and a number of skipped wakeup opportunities.

Advantageously, according to an example embodiment of the present invention, the deactivation of the sleep mode is controlled by the contribution indicator, which indicates how much the presently determined location information can contribute in terms of accuracy of the determination at other UEs in the vicinity. Activating the transmitter and receiver circuit based on the number of skipped wakeup opportunities has the advantage that on the one hand, energy consumption is reduced but on the other hand, the UE still will contribute at least every n-th wakeup opportunity.

An advantageous example embodiment of the present invention includes monitoring traffic on a radio channel; determining a transmission pattern that indicates at least a plurality of time instants for the transmission of the own location information based on the monitored traffic; and the transmission of the position information is based on the transmission pattern.

An advantageous example embodiment of the preset invention includes that the sleep mode is deactivated, if the contribution indicator indicates that the position information is not suited to contribute to the determination of the position of the at least one another apparatus.

Advantageously, according to an example embodiment of the present invention, the sleep mode is ended to update the position information.

An advantageous example embodiment of the preset invention includes monitoring traffic properties on a radio channel; wherein the contribution indicator is updated based on the monitored traffic property.

Advantageously, according to an example embodiment of the present invention, the contribution indicator is increased or decreased anti-proportional to the position information available on the monitored radio channel. Therefore, unnecessary traffic on the radio channel is avoided.

In an advantageous example embodiment of the present invention, the updating comprises determining a precision indicator that indicates the accuracy of the determined position information; the contribution indicator is determined based on the precision indicator.

Advantageously, according to an example embodiment of the present invention, the position information is transmitted only, if a certain confidence in precision is reached.

Another aspect of the present invention is directed to the following subject matter: An apparatus comprising deactivating means (i.e., deactivating arrangement) to deactivate a sleeping mode of an apparatus; transmitting means (i.e., transmitter) to transmit, after deactivation of the sleeping mode, an position information, if an associated contribution indicator indicates that the position information is suited to contribute to the determination of an position of at least one another apparatus; and activating means (i.e., activating arrangement) to activate, after the transmission of the position information, the sleeping mode.

A further aspect of the present invention is directed to the following subject matter: A method comprising monitoring a radio situation of a radio channel; determining a wakeup configuration for remote apparatuses, wherein the wakeup configuration is determined based on the monitored radio situation; and transmitting the wakeup configuration.

In an advantageous example embodiment of the present invention, the wakeup configuration comprises at least one of the following: a transmission pattern that indicates at least a plurality of time instants, at which a transmission of a position information by at least one remote apparatus should take place, and a wakeup pattern characterizing at least a plurality of time instants, at which at least a transmitter circuit of at least one remote apparatus is woken-up.

An aspect of the present invention is directed to the following subject matter: An apparatus comprising monitoring means (i.e., monitor) to monitor a radio situation of a radio channel; determining means (i.e., determining arrangement) to determine a wakeup configuration for remote apparatuses, wherein the wakeup configuration is determined based on the monitored radio situation; and transmitting means (i.e., transmitter) to transmit the wakeup configuration.

DETAILED DESCRIPTION OF EXAMPLE EMBODIMENTS

Figure 1:
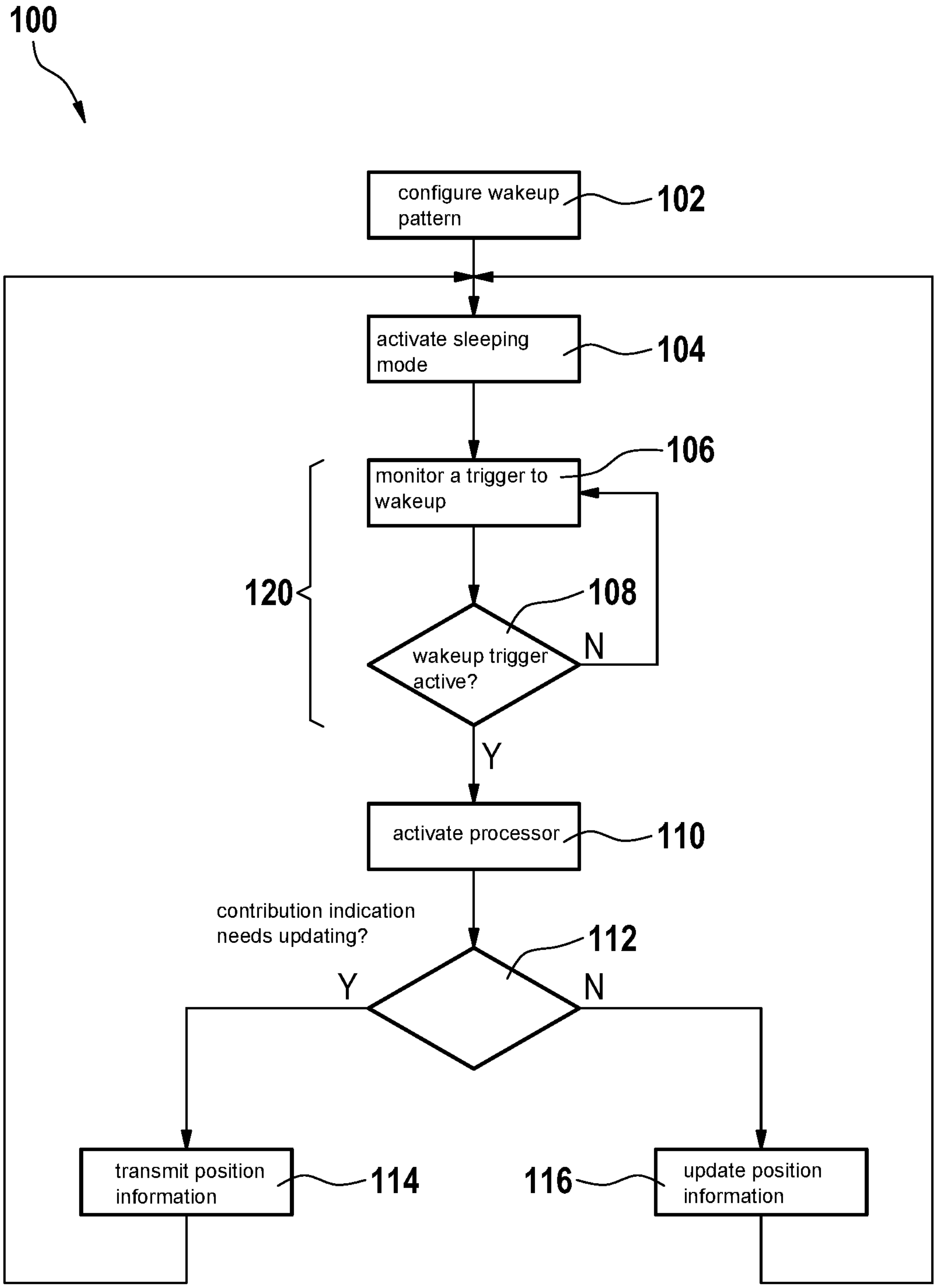
FIG. 1 depicts a flow diagram to operate a control unit, according to an example embodiment of the present invention.
Figure 2A:
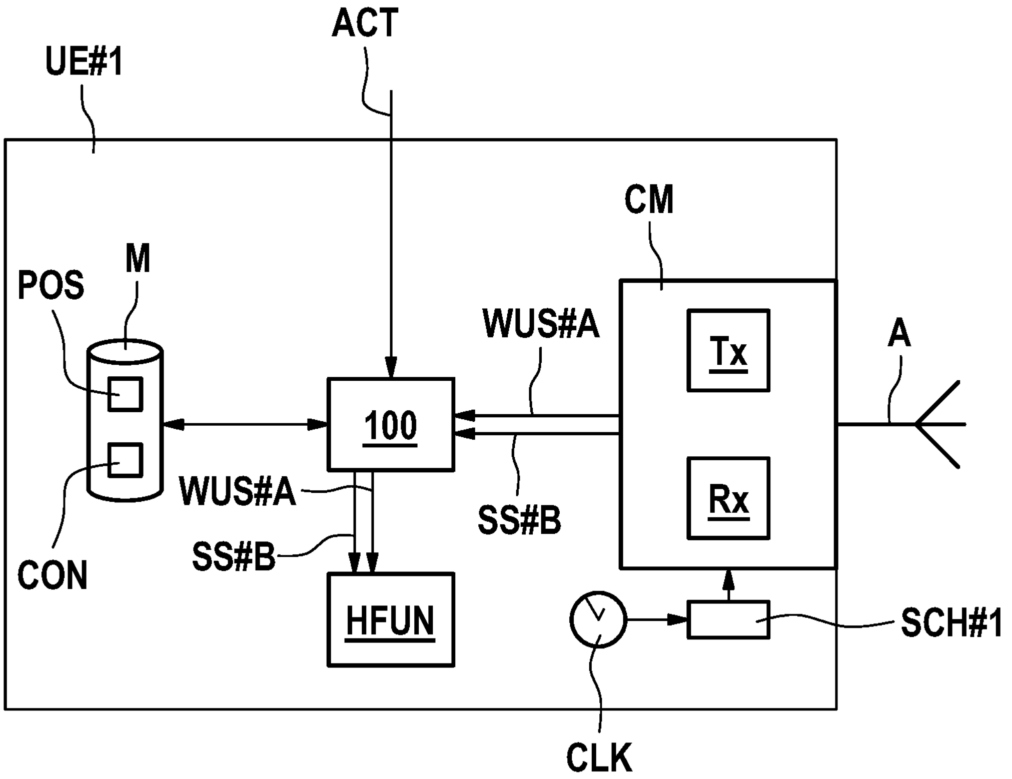
FIGS. 2A and 2B each depict a structure of an apparatus that comprises the control unit, according to an example embodiment of the present invention.
Figure 2B:
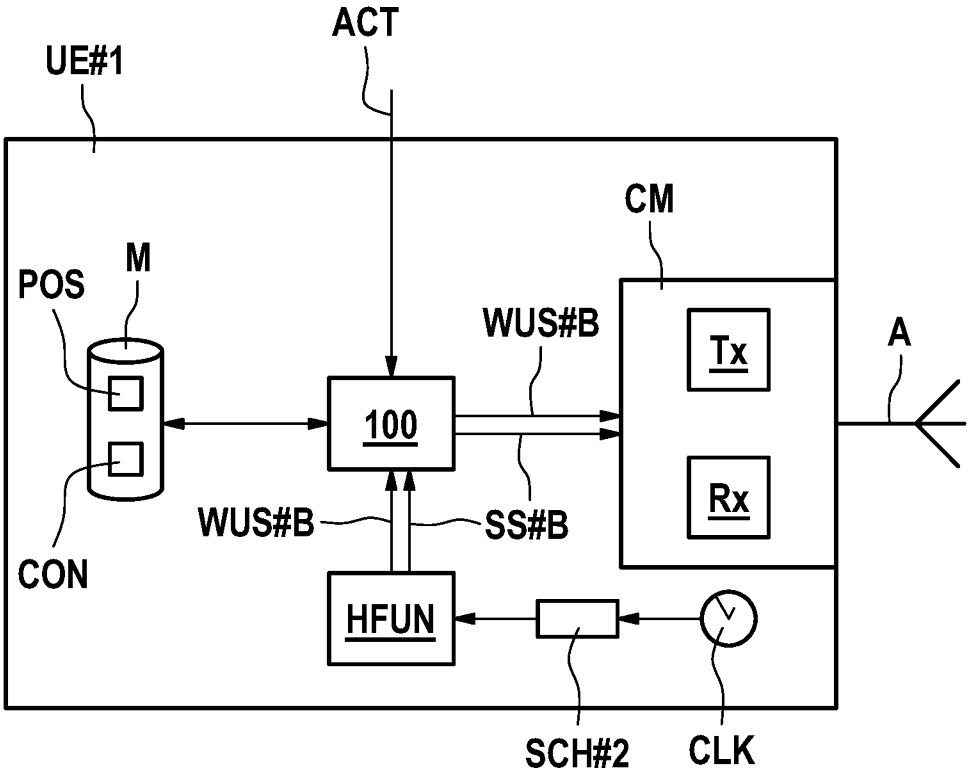

FIG. 1 depicts a schematic flow diagram for operating a control unit 100. FIGS. 2A and 2B each depict a schematic structure of an apparatus UE #1 that comprises the control unit 100 of FIG. 1. In the following, reference is made to FIGS. 1, 2A and 2B.

Configuring means 102 (i.e., configuring arrangement) configure the wakeup pattern used for at least waking up the Rx and/or TX transmitters Tx, Rx of a communication module CM of the apparatus UE #1.

Deactivating means (i.e., deactivating arrangement) 110 deactivate a sleeping mode of an apparatus UE #1. Transmitting means (i.e., transmitter) 114 transmit, via a sidelink channel or another radio channel, after deactivation of the sleeping mode, a position information POS, if an associated contribution indicator CON indicates that the own position information POS is suited to contribute to the determination of an position of at least one another apparatus UE #2. Activating means (i.e., activating arrangement) 104 activate, after the transmission of the own position information POS, the sleeping mode.

In sleep mode, both a transmitter circuit and a receiver circuit are in a sleeping mode. The sleeping mode comprises a deactivation of certain functions. Deactivating the sleeping mode comprises an activation at least one of the Rx circuit and the Tx circuit for operation. Activating the sleeping mode comprises a deactivation of at least one of the Rx circuit and the Tx circuit.

According to an example, the transmitted position information characterizes an at least temporarily stationary spatial position of the apparatus UE #1. Therefore, the transmitted position information is called own position information.

According to another example, the transmitted position information characterizes an at least one assisting position information that originates, for example, from a received satellite signal. Therefore, the transmitted position information is called assisting position information.

According to a further example, the transmitted position information characterizes an at least temporarily stationary spatial position of an apparatus different from the apparatus UE #1. Therefore, the transmitted position information is called remote position information.

In a segment 120, it is checked whether at least one of the circuits Tx and Rx is to be woken up. Monitoring or processing means (i.e., monitor or processor) 106 monitor a trigger to wake up at least one of the circuits Rx and Tx. Determining or processing means 108 determine, whether the wakeup trigger is active. If affirmative, determining or processing means 110 is activated. In the other case, the control unit 100 maintains the circuits Tx and Rx in sleep mode.

Determining or processing means (i.e., determining arrangement or processor) 112 determine whether the contribution indicator CON has to be updated, for example due to lack of precision. Updating means (i.e., updating arrangement) 116 update, after deactivation of the sleeping mode, the position information POS and the associated contribution indicator CON if the contribution indicator CON indicates that the position information POS is not suited to contribute to the determination of the position of the at least one another apparatus UE #2.

The position information POS and received position information comprises at least one of the following: an absolute position, a relative position, a relative distance. In particular, the spatial position information can be conveyed via a Cooperative Lane Merging, CLM, or via a Cooperative Perception Message, CPM.

The updating 116 of the position information POS and the associated contribution indicator CON is based on at least one or more of the following: at least one remote position information POS #2, which characterizes a spatial position of another apparatus UE #2, and which has been received; at least one satellite information, which characterizes at least a signal propagation delay between a satellite and the apparatus UE #1, and which has been received; and at least one distance information, which characterizes the relative distance between the apparatus UE #1 and another apparatus UE #2.

The position information POS and the associated contribution indicator CON are stored on a memory unit M. The control unit 100 is activated upon receiving an activation signal ACT from a further control unit. The activation signal ACT is generated, for example, upon parking the vehicle the apparatus UE #1 is part of.

The communication module CM comprises the circuit Rx for signal reception and reception processing and the circuit Tx for data processing and signal transmission. The communication module CM is communicatively coupled to at least one antenna A for transmission of radio signals.

If the apparatus UE #1 is part of a parked vehicle, the parked vehicle's location/position information is calculated and updated. The parked vehicle, will continuously or on selected time instance, e.g., periodically, detect its parked position x, y, z-coordinates as the position information POS and, if possible, it would enhance it enhance over time. The parked vehicle wakes up frequently and communicates its position information to the moving vehicles. Further example comprise a process to re-process positioning measurements and/or calculations.

The parked vehicle's apparatus UE #1 goes into power-saving mode, the sleeping mode, while parked allowing the described processes to wakeup/activate the UE to perform at least one of the following:

A) Waking up to receive directly before cooperative localization messages CLM/cooperative perception message CPM, this can be done to excite the wake-up signal WUS over sidelink before or at the beginning of CLM/CPM transmission;

B) Waking up to transmit CLM, in this case, a UE follows a strict waking up timer process e.g., discontinuous reception DRX where the UE #1 wakes up and conducts its transmission to perform channel access and sending sidelink and Uu transmission, wherein the messages comprising the own location information are transmitted during the active phase;

C) Waking up to adaptively compute its precise location: in this case, the UE #1 is requested to wake up to update its location or correct it. According to an example, an internal timer is excited at an activation phase to perform SL positioning calculation or GNSS positioning update or Uu positioning information acquisition. Another alternative, is to have a road-side unit that sends a wakeup signal to all or some or one of the parked UE to wake up and update the position. Therefore waking-up the apparatus UE #1 can internally or externally controlled.

During the wake-up time or when a WUS is received or when a WUS is expected, it is up to the UE to wake up or continue sleeping based on a threshold. This threshold identifies how often the UE wakeup for example, the UE may not skip more than N-wakeups or the UE may not continue sleeping for more than a maximum timer T_max and how accurate is the precise positioning calculated internally.

After the UE #1 wakes up or the UE is excited by a WUS i.e., by themselves or by an external entity, one or more of the following procedures is/are executed. For example, according to method (1), the vehicle does have a precise location information or the accuracy is below a certain value or the UE is sleeping for a time exceeds T_Max/skipped N-wakeups; hence, the vehicle shall wake up and perform one or more of the following: Start its receivers/transmitters and send/receive sidelink; Transmits the detected satellites via, e.g., sidelink and V2X messages. The UE #1 receives other CLMs/CPM transmitted by other active vehicles if existing with the other vehicles' positioning information. Then, the vehicle enhances its position information based on the received CLM information.

According to a method (2), the vehicle has its parked position, which is identified before sleeping. The position is with a certain confidence threshold, e.g., 0.5 m accuracy and just aid the others. Hence, the UE may not need to update/re-calculate its position. Therefore, the UE only wakes up to: Send the position information, added to a V2X signal, which may allow, e.g., Sidelink positioning. The receiving vehicle computes the ranging from the communication signal and the position from the received coordinates.

According to a method (3), the vehicle starts with method (1) until it reaches a certain convergence; hence, it switches to method (2) after it reached a certain confidence, i.e., threshold, e.g., 0.5 m accuracy.

In the sidelink-based positioning mode, the apparatus UE #1 determines the location information based on provided positioning assistance originating from RSUs via Uu-link from gNB/LCS. Alternatively or additionally, such a S-PRS configuration could be determined by RSUs regardless of the connection with a network. Each RSU transmits S-PRS along with its absolute position information over sidelink and vehicle performs measurement procedure from the received S-PRSs. The vehicle/the apparatus UE #1 calculates its position by using the measurements and the absolute positions of RSUs.

According to another example, the positioning assistance data for positioning set-up/operation can be provided to vehicles/VRUs from gNB/LCS or can be determined by the vehicles/VRUs participating the positioning procedure. Considering RTT-based positioning, ego-vehicle transmits a request S-PRS and receives a response S-PRS (as a response) from neighbor vehicle/VRU. In addition, during the S-PRS exchange, ego-vehicle obtains the measurements of relative distance and AoA basically needed for a relative positioning. The ego-vehicle calculates the relative position to neighbor vehicle/VRU.

There are several options to wake up the different components of the UE #1:

According to an example depicted in FIG. 2A, the radio part in form of the communication module CM and its waking up procedure a wakeup signaling WUS #A is generated, which is externally triggered by another TX or a configuration (e.g., including discontinuous reception), so that higher layer function HFUN wakes up for positioning enhancements. Once lower layers in form of the communication module CM or parts thereof are awake, they may conduct SL positioning and sends range/angles to upper layers in form of the higher-layer function HFUN. Also lower layers may receive the container of other higher layer mechanisms like CLM/CPM and forward it to higher layers in form of higher-layer function HFUN. In this case, lower layers wake up higher layers after being active and in charge. Upon a timer or a signal from a scheduler SCH #1, that is served by a clock CLK, for example a GNNS (Global Navigation Satellite Systems) clock, or upon a further request received from another radio terminal or radio access node, lower layers may request higher layer to sleep again via sleep signal SS #A. In other words, the deactivating of the sleeping mode and activating of the sleeping mode of the higher layer function HFUN is controlled by the communication module CM.

According to another example depicted in FIG. 2B, waking up the higher layer function HFUN is conducted via a scheduler SCH #2 that is served by the internal accurate computer clock CLK. In this case lower layers are not controlling the higher layers to wake-up and sleep, but rather the opposite, i.e., higher layers drive the lower-layer connectivity module to sleep or come again awake. Once higher layer function HFUN wakes up lower layers via a wake-up signal WUS #B. Lower layers in form of the communication module CM are activated and observe the radio environment as other receivers do. For example, the internal clock CLK may be based on satellite seconds or positioning GPS/GNSS seconds, so that the scheduler SCH #2 schedules the higher layer function HFUN to wake up for positioning enhancements. Upon a signal from a scheduler SCH #2, higher layer function HFUN requests the communication to sleep again via sleep signal SS #B. In other words, the deactivating of the sleeping mode and the activating of the sleeping mode of the communication module CM is controlled by a higher layer function HFUN.

Figure 3:
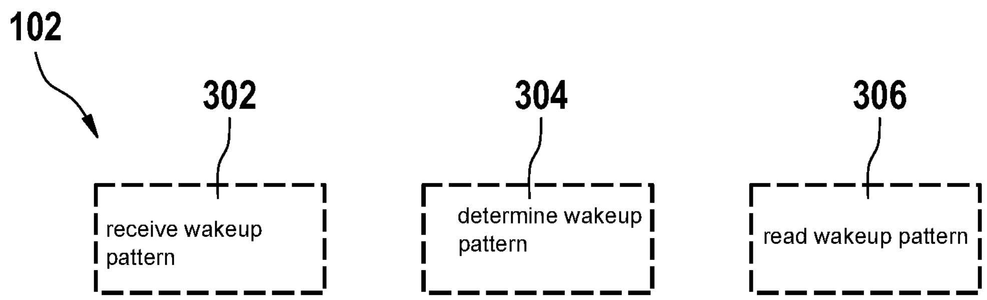
FIG. 3 depicts examples for configuring means (i.e., configuring arrangement).

FIG. 3 depicts a plurality of examples for the configuring means (i.e., configuring arrangement) 102. Receiving means (i.e., receiver) 302 receive or determining means (i.e., determining arrangement) 304 determine or reading means (i.e., reading arrangement) 306 read from a memory: a wakeup pattern characterizing at least a plurality of time instants, at which at least a receiver circuit Rx is woke-up. The sleep mode is deactivated 110, if the wakeup pattern indicates an end of the sleep mode.

For example, an internal clock is excited upon the sleep/activation cycle, e.g., either periodically or quasi-periodically, or aperiodic i.e., either completely random or following a pattern-based on wake-up cycles. According to an example, the wakeup pattern is determined 304 pseudo-randomly or is pre-configured in the vehicular UE or is configured by the network for parked vehicles e.g., configuration can be sent shortly before parking or during a Go-To-Sleep GTS signal via receiving 302 the configuration C.

According to an example, the wakeup pattern is specific for vehicles associated with a specific parking zone or tuned to a resource pool configuration, wherein the zone and/or its resource pool could be the one configured for sidelink.

According to an example, a specific parking zone and/or the associated parking resource pool is configured via the parking lot dedicated network i.e., via Uu or sidelink in the parking area. In other words, the wakeup patterns, for example DRX patterns, are dedicated to such a zone configuration and/or to the associated resource pool configuration of this zone/service. In this case, if a UE is existing in multiple/overlapping zones or belongs to one zone but with two or more wake-up services e.g., parking level 1 and parking level 2, this UE shall follow the wakeup pattern of both zones or services. In this case, the UE is requested to tune to the associated resource pools.

Figure 4:
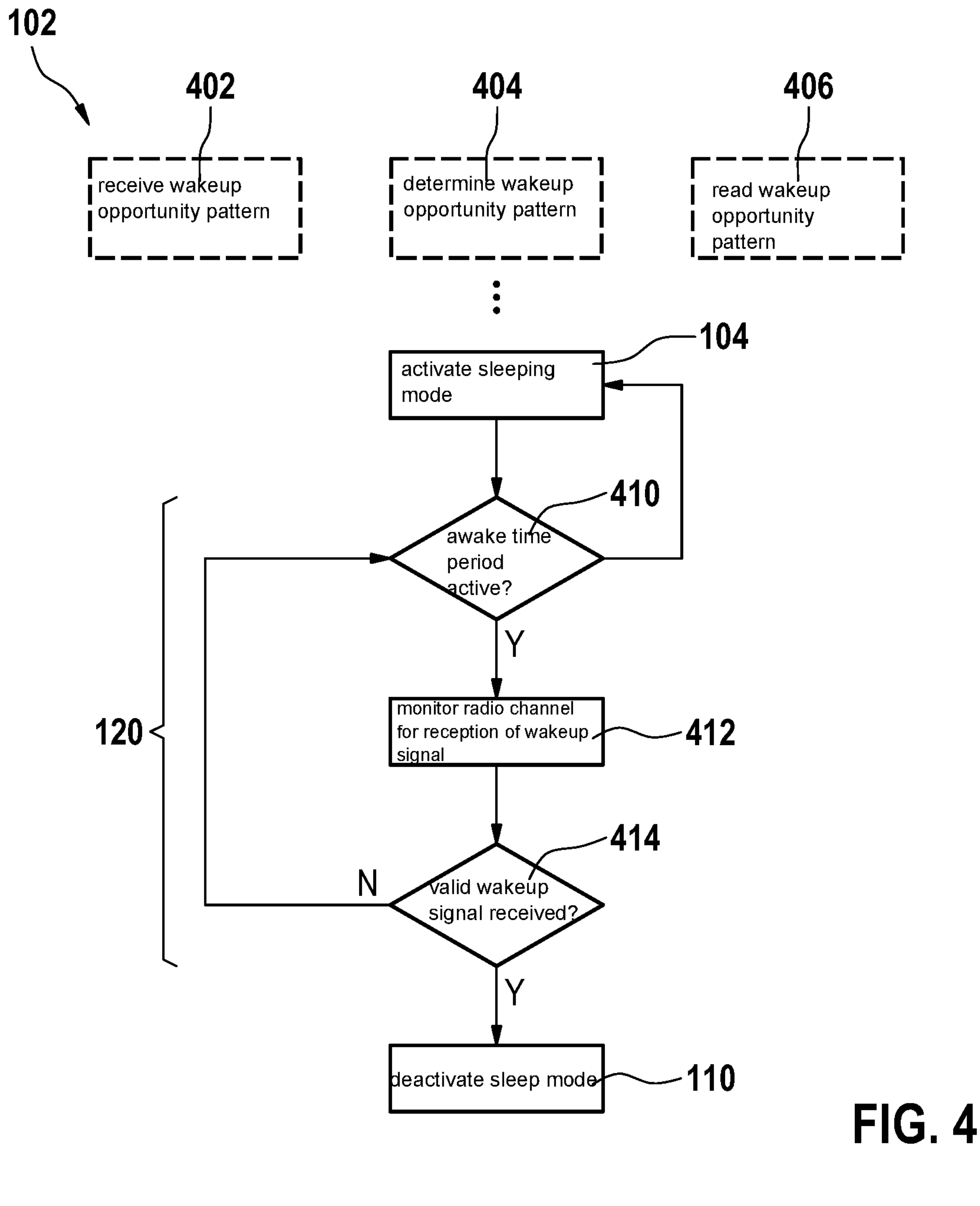
FIG. 4 depicts a flow diagram according to an example embodiment of the present invention.

FIG. 4 depicts a plurality of examples for the configuring means (i.e., configuring arrangement) 102 and a schematic sequence chart. Receiving means (i.e., receiver) 402 receive or determining means (i.e., determining arrangement) 404 determine or reading means (i.e., reading arrangement) 406 read: a wakeup opportunity pattern characterizing at least a plurality of time periods, at which at least the receiver circuit Rx is awake. Determining or processing means (i.e., processor) 410 determine whether one of said time periods is active. If the affirmative, the monitoring 412 during at least one of the time periods a radio channel for a reception of a wakeup signal WUS #1, WUS #2. The sleep mode of the Tx circuit is deactivated 110, if the wakeup signal WUS #1, WUS #2 is received during the at least one time period. Activating 104 the sleep mode is conducted, if no wakeup signal is received during the at least one time period.

Determining or processing means (i.e., determining arrangement or processor) 414 determine, whether a valid wakeup signal WUS has been received. If the affirmative, the wakeup procedure is started via deactivating sleep mode means (i.e., sleep mode arrangement) 110.

The wakeup signal WUS #1, 2 represents an external request, which is sent via the sidelink channel. For example, the moving vehicle or a roadside unit sends sidelink/V2V communication signals including the WUS #1, 2 i.e., over sidelink waveform. In this case, the WUS #1, 2 shall be configured and expected by the receivers parked in a certain lot/area. For example, the WUS #1, 2 can be periodic via periodic DRX cycle only to check the WUS transmission or quasi-periodic via quasi-periodic DRX cycle only to check the WUS transmission. The latter quasi-aperiodic DRX cycle to check WUS may follow a certain pattern.

According to an example, the periodicity or the pattern of transmission of WUS #1, 2—WUS pattern—is configured for vehicles parked in a certain zone or tuning to the associated resource pool configuration for this zone or for the parking service, wherein the zone and/or the resource pool could be the one configured for sidelink. Additionally, specific parking zone and/or the associated parking resource pool could be configured via the parking lot dedicated network i.e., via Uu or sidelink in the parking area. In other words, the WUS pattern is dedicated to such a zone configuration and/or to the associated resource pool configuration of this zone/service. In this case, if a UE is existing in multiple/overlapping zones or belongs to one zone with two wake-up WUS patterns e.g., parking level 1 and parking level 2, this UE shall follow the wakeup pattern of both zones.

According to an example, WUS #1, 2 is transmitted via Uu WUS/paging events: a base-station can also send a WUS signal on the direct communication between the vehicle and the network e.g., Uu/V2N.

Figure 5:
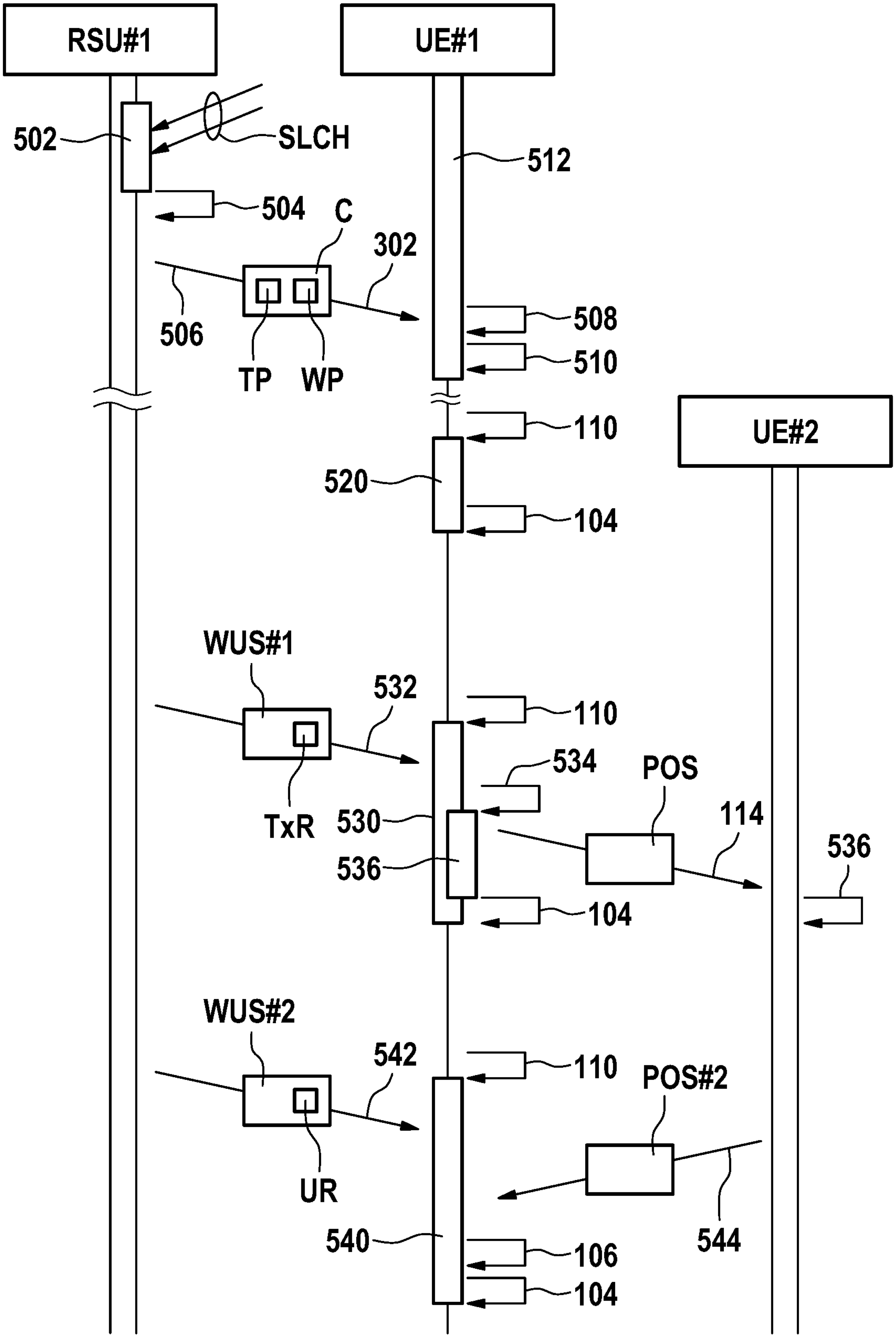
FIG. 5 depicts a sequence chart for a managed mode, according to an example embodiment of the present invention.

FIG. 5 depicts a schematic sequence chart for a managed mode, where at least a configuration C is transmitted to the apparatus UE #1. In this example, a roadside unit RSU #1 is transmitting the configuration C and the wakeup signals WUS #1, 2. However, also other entities like a gNodeB/UE #2 may transmit the configuration C/the wakeup signals.

The RSU #1 is operated according to the following: Monitoring means (i.e., monitor) 502 monitor a radio situation of a radio channel SLCH. Determining means (i.e., determining arrangement) 504 determine a wakeup configuration C for remote apparatuses UE #1, UE #2, wherein the wakeup configuration C is determined based on the monitored radio situation. Transmitting means (i.e., transmitter) 506 transmit the wakeup configuration C. The wakeup configuration C comprises at least one of the following: a transmission pattern TP that indicates at least a plurality of time instants, at which a transmission of a position information POS by at least one remote apparatus UE #1, UE #2 should take place, and a wakeup pattern WP characterizing at least a plurality of time instants, at which at least a transmitter circuit Tx of at least one remote apparatus UE #1, UE #2 is woke-up.

After receiving 302 the configuration C during an Rx active phase 512, the apparatus UE #1 applies 508 the configuration and goes 510 to sleep.

According to a time period 520 of the associated wakeup pattern WP, the apparatus UE #1 turns on 110 its receiver Rx and monitors the sidelink channel SLCH. As no wakeup signal is received, its receiver Rx goes 104 to sleep.

During a time period 530, that is initiated by the wakeup pattern, the Rx circuit is on. Receiving means (i.e., receiver) 532 receive the at least one wakeup signal WUS #1 that comprises a transmission request TxR. If the Tx circuit is sleeping, the Tx circuit is activated 534 during a phase 536. The apparatus UE #1 transmits the position information POS to the apparatus UE #2. After the transmission of the position information POS, the apparatus UE #1 goes 104 into sleep mode. After receiving the position information POS, the apparatus UE #2 updates 536 its location information POS #2.

During a further time period 540, at least or only the Rx circuit is active. Receiving means (i.e., receiver) 542 receive at least one further wakeup signal WUS #2 that comprises an update request UR, wherein the updating 116 of the position information POS and the associated contribution indicator CON is conducted upon receiving the update request UR.

The updating 116 can be conducted based on position information POS #2 received 544 from the apparatus UE #2 or other apparatuses. Of course, other options for updating 116 are available, cf. above.

According to an example, the WUS #1, 2 has a dedicated signal structure to be identified/detected by sleeping vehicles. Detection/identification can be either by correlation/matching e.g., preamble or blindly decoding of the initial parts of the WUS, e.g., the control part of the signal. The sleeping vehicles can be configured by network/pre-configured e.g., saved offline to perform WUS detection/decoding/correlation/scanning with a certain periodicity or patterns. This pattern is similar to the DRX cycle. However, the UE only wake up to detect the WUS #1, 2. Identifiers, e.g., IDs, to the exact vehicle unicast-like wakeups or multiple vehicles groupcast-like wakeups can be conveyed with the wakeup signal WUS #1, 2. Further control information conveyed with the WUS #1, 2 comprises at least one of the following: a request for sending CLM, a request for receiving CLM, a request for sending sidelink positioning reference symbols SPRS, a request for perform sidelink positioning, a request for perform Uu positioning, a request to perform GNSS acquisition, etc.

Deactivating 110 of the sleep mode is based on at least one of the following: the contribution indicator CON; and a number of skipped wakeup opportunities.

Figure 6:
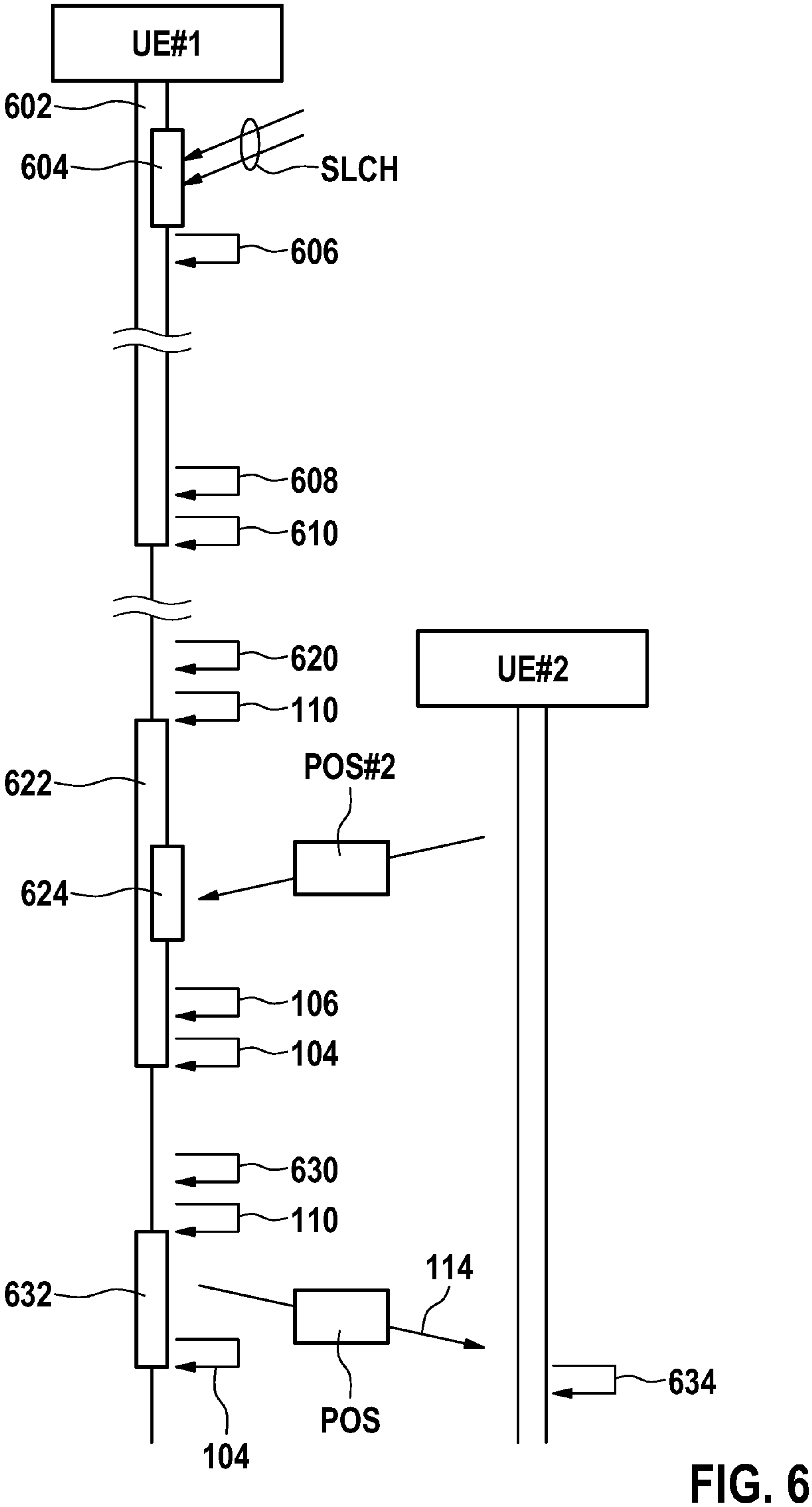
FIG. 6 depicts a sequence chart for the managed and unmanaged mode, according to an example embodiment of the present invention.

FIG. 6 depicts a schematical sequence diagram. The following can be conducted during a managed mode, where at least a wake-up pattern is received from a central entity has to be obeyed. On the other hand, the following can be conducted during an unmanaged mode, where no central entity manages the sleeping mode of the apparatus UE #1.

During the period 602, at least the circuit Rx is active. Monitoring means (i.e., monitor) 604 monitor traffic on a radio channel SLCH. Determining means (i.e., determining arrangement) 606 determine a transmission pattern that indicates at least a plurality of time instants for the transmission of the own location information LOC based on the monitored traffic. The transmission 114 of the position information POS is based on the transmission pattern.

Irrespective, whether a transmission pattern is determined or not, the apparatus UE #1 determines 608 a wakeup pattern for waking up at least the Rx circuitry. At step 610, the sleep mode is activated.

For example, CLM enabled stations determine the transmission pattern and a jitter based on: Listening for a certain time and estimate the number of stations transmitting for every GPS second RSUs and other stations included. RSUs may take a special role and be excluded from this step.

For positioning improvement, the stations that require improving their position information process the data received from other stations to do collaborative positioning. This is specially the case for moving stations, but is also useful for parked cars that require improving their position. Further, also infrastructure may benefit from the transmitted data, as it can compute the positions of the transmitting stations. A use case is a parking lot management system.

According to an example, based on the received data number of transmitting stations, data accuracy of connected stations, etc. the transmission pattern is determined. Furthermore, the transmission pattern is determined based on at least one of the following: a battery status, an access of power, a radio traffic status overcrowded or free radio resources, a present positioning accuracy, transmission patterns of other UEs, station dynamics static station has higher weight.

As an example, if the network consists of 15 connected CLM-enabled stations, a single station receives 11 updates per GPS second due to packet losses etc. In this traffic situation and due to the respective positioning accuracy contributions by the collaboration partners, the station may determine that 6 updates per second would be sufficient. In view of its low battery status and the poor quality of its own satellite measurements e.g., due to shadowing by tall buildings in its direct vicinity the transmission algorithm would determine to transmit a CLM only every 6 CLM periods. The system can be designed such, that it converges quickly to a stable solution in steady state, since if, e.g., the other stations lower their transmission rates as well e.g., only 5 updates per second now from the network, then the station would increase its transmission frequency again. Apart from waking up for transmission purposes only, the station may also determine a waking up pattern for reception in case its positioning accuracy is too low. It will then not transmit at least until its positioning solution is good enough, but only receive and enhance its positioning.

According to another example, a message generation jitter ms, FAC layer is determined. The task of this jitter is to avoid simultaneous transmission by a large subgroup of the connected stations. The more stations are connected, the larger the required expectancy value of the jitter. Example: a network broadcasting 6 messages, e.g., of 1 ms air time each per GPS second needs at least a jitter of 6 ms. If randomly allocated, the jitter should be even larger to avoid packet collisions. Higher update rates will require larger generation jitters. Step 2 and 3 are processed in parallel and on a continuous basis, constantly updating the transmission pattern to cope with the requirements of the dynamic environment.

According to a further example, a station checks that there is 6 stations transmitting per GPS period in average. $N_{min}=5$ so theoretically it is enough data being transmitted. However, it notices that its positioning accuracy is higher than the average, so it will decide to transmit, but due to low battery state, it will do so only every 3 GPS seconds periodic transmission pattern. It further determines that it must send in a window of 7 ms after the GPS second in question.

According to another example, a wakeup at GPS seconds is defined by earlier defined pattern. Receive other stations messages to update transmission pattern and jitter step 1. Simultaneously transmit the own message within the previously defined time window. In other words, the station transmits within the 7 ms determined in Example 2 after the GPS second where it wakes up and listens to messages within approx. the same time window.

The sleep mode is deactivated 110 and according to an example, the Rx circuit is activated while the Tx circuit remains sleeping, if the contribution indicator CON indicates that the position information POS is not suited to contribute to the determination of the position of the at least one another apparatus UE #2. Accordingly, for a time period 622, at least the Rx circuit is active.

Monitoring means (i.e., monitor) 624 monitor traffic properties on a radio channel SLCH for example counting a number of radio terminals that are communicating their position information POS #2 in the vicinity of the apparatus UE #1. The contribution indicator CON is updated 106 based on the monitored traffic property, wherein the updating 116 comprises: determining a precision indicator that indicates the accuracy of the determined position information POS, wherein the contribution indicator CON is determined based on the precision indicator.

Determining or processing means (i.e., determining arrangement or processor) 630 determine that the contribution indicator CON indicates that the position information is to be sent. Accordingly, the sleep mode ends 104 and at least the Tx circuit is activated during time period 632. Then the position information POS is transmitted 114 and the apparatus UE #1 activates 104 its sleep mode. The apparatus UE #2 determines 634 its position information based on the received position information POS.

Figure 7:
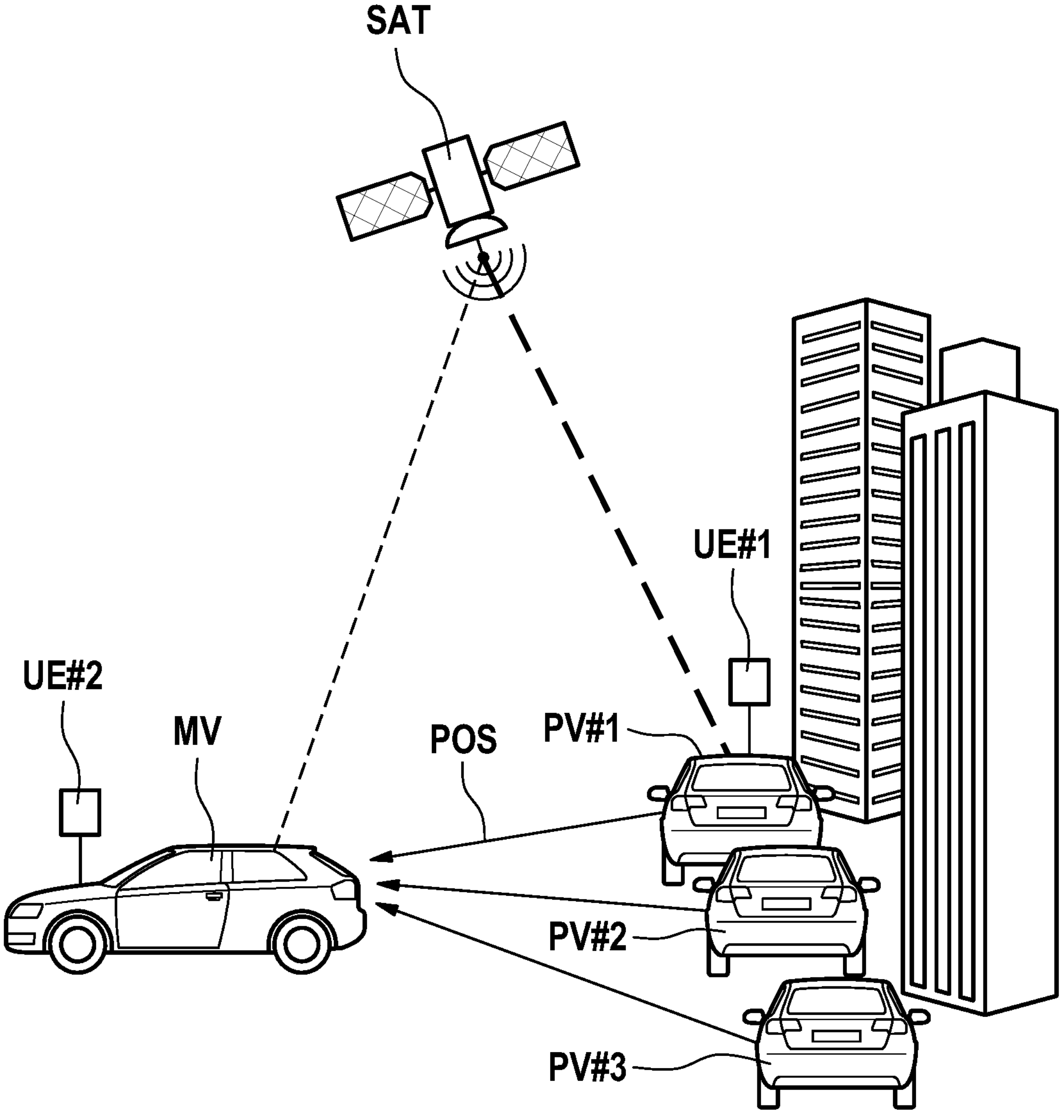
FIG. 7 depicts a situation with parked vehicles.

FIG. 7 depicts a situation with parked vehicle VP #1-3, for example in a parking lot, and a moving vehicle MV. The moving vehicle MV in the vicinity of the parked ones requests and/or receives and/or transmits CLM. The moving vehicle MV sends and receives messages from/to parked vehicle when they get activated e.g., wakeup. In addition to CLM, the active vehicle may compute additionally sidelink positioning to/from other vehicle. In this case, the active vehicle may send a sidelink positioning reference symbol or receive a sidelink positioning reference symbol SPRS from other vehicle. In this case, second vehicle doesn't have to request positioning symbols, but rather receive and/or transmit sidelink messages, which contains sidelink positioning reference symbol. Hence, at least when the second vehicle receives sidelink message, it will be able to conduct sidelink positioning measurements as well. A satellite SAT provides satellite signals which are received by the vehicles MV, PV #1-3 for updating its respective position information. Wherein the sidelink positioning values are provided by means of physical measurements on the received sidelink positioning request signal, e.g., like time-of-flight (ToF) and/or angle-of-arrival/departure (AoS/AoD) and/or Phase and Amplitude Change (PAC).

Figure 8:
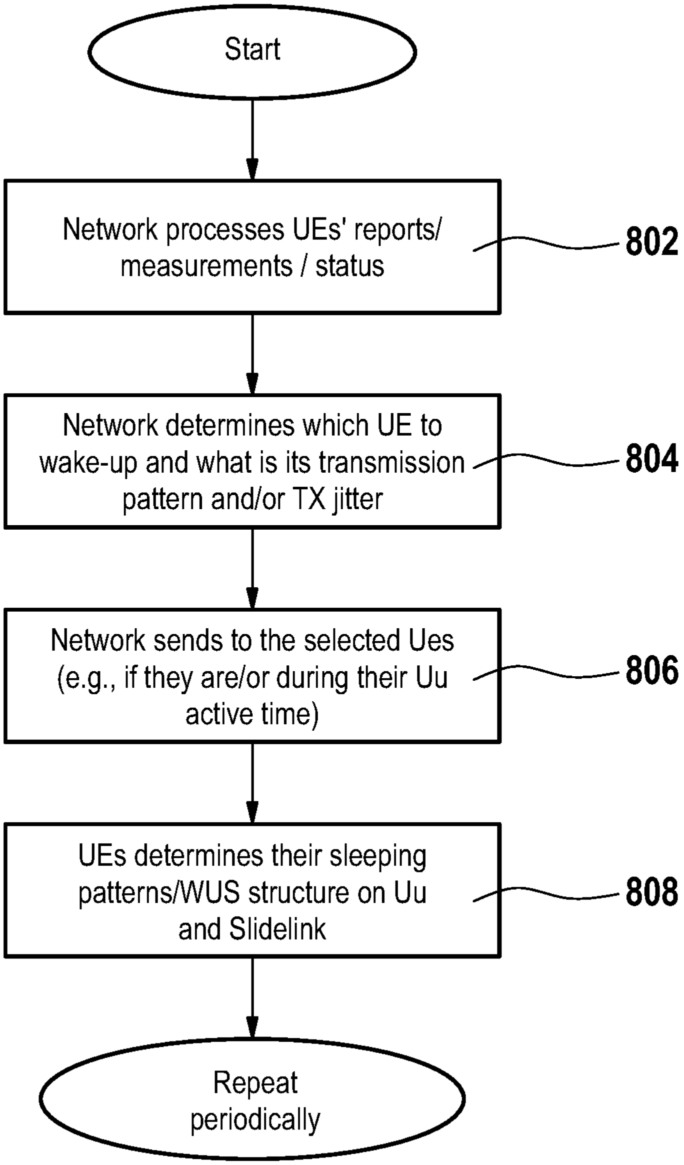
FIG. 8 depicts a schematic flow chart directed to the network assisting procedure, according to an example embodiment of the present invention.

FIG. 8 depicts a schematic flow chart directed to the network assisting procedure for conveying instruction about wakeups to the UEs, cf. FIG. 5. Monitoring means (i.e., monitor) 802 determine a radio situation from the observed measurements, UE reports, etc. Determining or processing means (i.e., determining arrangement or processor) 804 determine a wakeup pattern, a transmission pattern and a transmission jitter pattern as part of the configuration for the radio terminals/apparatuses UE. Transmitting means (i.e., transmitter) 806 transmits the configuration to the UEs. According to an example, determining or processing means (i.e., determining arrangement or processor) 808 apply the received configuration.

Figure 9:
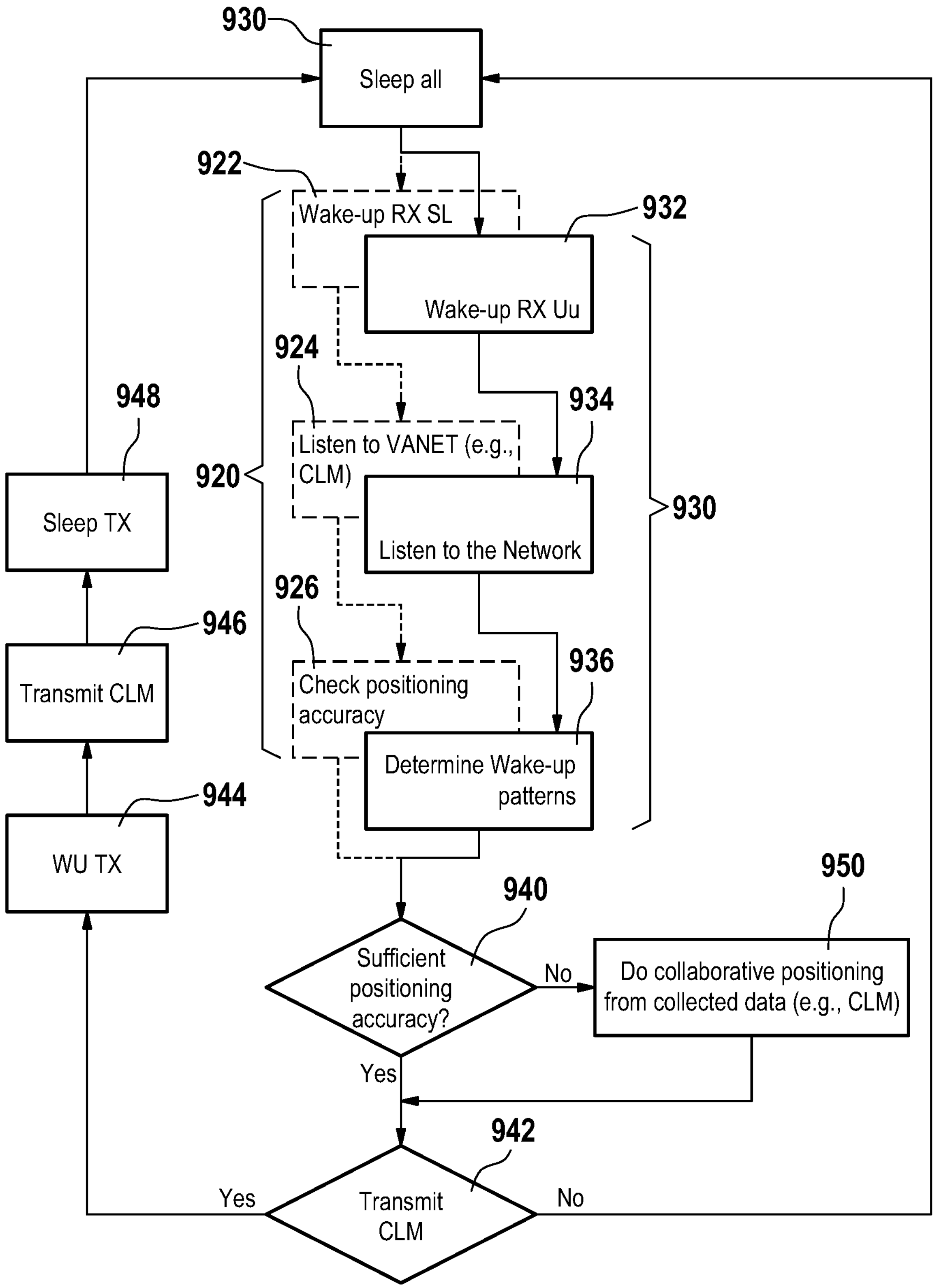
FIGS. 9 and 10 each depict in a schematic flow chart an operation of an apparatus on a sidelink channel, according to an example embodiment of the present invention.

FIG. 9 depicts in a schematic flow chart an operation 910 of the apparatus UE #1 on a sidelink channel and an operation 920 on downlink/uplink channels. Activating means 930 (i.e., activating arrangement) activates sleep mode for Rx and Tx circuitry.

Activating means (i.e., activating arrangement) 922 activate the Rx circuitry for receiving signals on the sidelink channel. Monitoring means (i.e., monitor) 924 monitor the radio traffic on the sidelink channel. Depending on the determined radio traffic, the position accuracy is determined via determining or processing means (i.e., processor) 926.

Activating means (i.e., activating arrangement) 932 activate the Rx circuitry for receiving signals on the downlink channel. Monitoring means (i.e., monitor) 934 monitor the radio traffic on the downlink channel. Depending on the determined radio traffic, a wakeup pattern is determined via determining or processing means (i.e., processor) 936.

Determining or processing means (i.e., determining arrangement or processor) 940 determine whether the accuracy of the determined position information is sufficient. If affirmative, determining or processing means (i.e., determining arrangement or processor) 942 determine whether a CLM is transmitted. If the affirmative a wakeup signal is transmitted via transmitting means (i.e., transmitter) 944, the CLM is transmitted via transmitting means (i.e., transmitter) 946, and subsequently, activating means (i.e., activating arrangement) 948 activate the sleep mode for the Tx circuit.

If the accuracy of the position information is not sufficient, the position information is determined via determining or processing means (i.e., processor) 950 based on collected position information.

Figure 10:
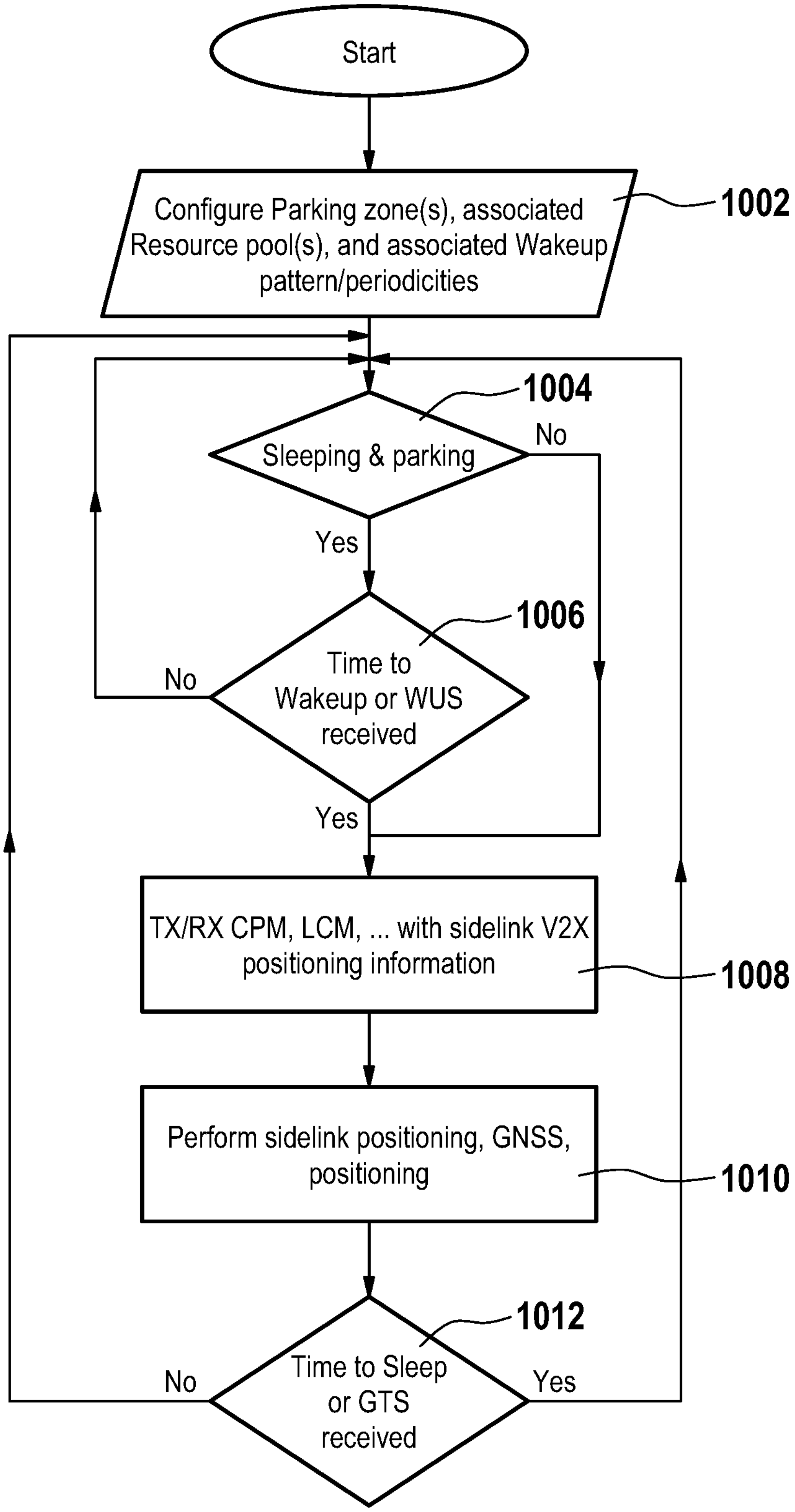

FIG. 10 depicts a schematic flow diagram for operating a radio terminal or apparatus UE #1. Configuring means 1002 (i.e., configuring arrangement) configure the apparatus according to a received or determined configuration. Determining or processing means (i.e., determining arrangement or processor) 1004 determine whether the apparatus is sleeping. If affirmative, determining or processing means 1006 (i.e., determining arrangement or processor) checks, whether the point in time arrived to wakeup the Tx and/or Rx circuitry. If affirmative, communication means (i.e., communication arrangement) 1008 communicate position information. According to determining means (i.e., determining arrangement) 1010 the own location is updated. Determining means (i.e., determining arrangement) 1012 determine whether a point in time arrived to initiate the sleep mode.

What is claimed is:

1. A method, comprising:

receiving or determining or reading a wakeup opportunity pattern characterizing at least a plurality of time periods at which at least a receiver circuit is awake;

monitoring during at least one of the time periods a radio channel for a reception of a wakeup signal;

deactivating a sleep mode of an apparatus, wherein the sleep mode is deactivated when the wakeup signal is received during the at least one time period;

obtaining, by the apparatus and based on an evaluation of position information related to the apparatus, a contribution indicator that indicates whether the position information is suitable to contribute to a determination of a position of at least one other apparatus, wherein the position information is considered suitable when the position information satisfies a predefined suitability criterion based on:

(i) a precision indicator characterizing an accuracy of the position information;

(ii) a comparison with a precision threshold; and/or (iii) a spatial relationship between the apparatus and the at least one other apparatus;

transmitting, after the deactivation of the sleep mode, the position information, the transmitting being performed conditional upon that the contribution indicator indicates that the position information is suitable to contribute to the determination of the position of the at least one other apparatus.

2. The method according to claim 1 comprising:

updating, after the deactivation of the sleep mode, the position information and the contribution indicator when the contribution indicator indicates that the position information is not suitable to contribute to the determination of the position of the at least one another apparatus.

3. The method according to claim 2, wherein the updating of the position information and the contribution indicator is based on at least one or more of the following:

at least one remote position information, which characterizes a spatial position of another apparatus, and which has been received;

at least one satellite information, which characterizes at least a signal propagation delay between a satellite and the apparatus, and which has been received; and at least one distance information, which characterizes the relative distance between the apparatus and another apparatus.

4. The method according to claim 2, further comprising:

receiving at least one further wakeup signal after which a receiver of the at least one further wakeup signal is expected to receive an update request, wherein the update request includes an message that requests a receiver node to perform the updating of the position information and the associated contribution indicator upon receiving the update request.

5. The method according to claim 2, wherein the updating includes:

determining a precision indicator that indicates the accuracy of the position information;

wherein the contribution indicator is determined based on the precision indicator.

6. The method according to claim 1, further comprising:

receiving or determining or reading a wakeup pattern characterizing at least a plurality of time instants, at which at least a receiver circuit is woken-up;

wherein the sleep mode is additionally deactivated when the wakeup pattern indicates an end of the sleep mode.

7. The method according to claim 1, further comprising:

activating the sleep mode when no wakeup signal is received during the at least one time period.

8. The method according to claim 7, further comprising:

receiving a wake up indication including receiving a wake-up signal during the at least one time period, or activating the sleep mode when no wakeup indication is received during the at least one time period;

wherein the wake-up signal has a specific signaling and structure indicating for at least a specific receiver triggering to wake up its receiver and or lower layer transmission capabilities.

9. The method according to claim 7, wherein the at least one wakeup signal includes a transmission request.

10. The method according to according to claim 1, further comprising:

receiving at least one wakeup signal, wherein the wakeup signal itself or a following signal includes a transmission request, wherein the transmission request includes a sidelink positioning request signaling, wherein the sidelink positioning request signaling is used by a receiver to measure a physical distance range between the receiver and a transmitter that transmitted the sidelink positioning request.

11. The method according to according to claim 1, further comprising:

receiving, by a receiver, a sidelink positioning request, the receiver being triggered to measure, using physically measuring of a time-of-flight (ToF) and/or angle-of-arrival/departure (AoS/AoD) and/or phase and amplitude Change (PAC) of the sidelink positioning request signal, a distance range and/or a position angle between the receiver and a transmitter that transmitted the sidelink positioning request during a wake-up time.

12. The method according to according to claim 11, further comprising:

triggering the receiver that receives the sidelink positioning request to transmit a response to the sidelink positioning transmission request;

wherein the response incorporates the distance range and/or the position angle between a transmitter of the request and the receiver, wherein values of the sidelink distance range and/or the position angle are incorporated in a physical transmission waveform or in lower layer messages during a wake-up time.

13. The method according to according to claim 11, further comprising:

sending, by the receiver that received the sidelink positioning request during the wakeup time, the measured distance range and angle values to the transmitter.

14. The method according to claim 1, further comprising deactivating of the sleep mode based at least in part on a number of skipped wakeup opportunities.

15. The method according to claim 1, further comprising:

monitoring traffic on a radio channel;

determining a transmission pattern that indicates at least a plurality of time instants for a transmission of the own position information based on the monitored traffic;

wherein the transmission of the position information is based on the transmission pattern.

16. The method according to claim 1, further comprising deactivating the sleep mode when the contribution indicator indicates that the position information is not suited to contribute to the determination of the position of the at least one another apparatus.

17. The method according to claim 1, further comprising:

monitoring traffic properties on a radio channel;

wherein the contribution indicator is updated based on the monitored traffic property.

18. The method according to claim 1, wherein the deactivating of the sleep mode and an activating of the sleep mode of a higher layer function is controlled by a communication module.

19. The method according to claim 1, wherein the deactivating of the sleep mode and an activating of the sleep mode of a communication module is controlled by a higher layer function.

20. The method according to claim 1, further comprising:

determining, based on the obtained contribution indicator, whether the position information is suitable to contribute to the determination of the position of at least one other apparatus, wherein the transmitting is based on a result of the determination.

21. An apparatus, comprising:

a transmitter; and a processor, wherein:

the apparatus is transitionable between a sleep mode and an awake mode by the processor;

the transmitter is controllable by the processor, and the processor is configured to:

receive or determine or read a wakeup opportunity pattern characterizing at least a plurality of time periods at which at least a receiver circuit of the apparatus is awake;

monitor during at least one of the time periods a radio channel for a reception of a wakeup signal;

deactivate the sleep mode of the apparatus, wherein the sleep mode is deactivated when the wakeup signal is received during the at least one time period;

obtain, based on an evaluation of position information related to the apparatus, a contribution indicator that indicates whether the position information is suitable to contribute to a determination of a position of at least one other apparatus, wherein the position information is considered suitable when the position information satisfies a predefined suitability criterion based on:

(i) a precision indicator characterizing an accuracy of the position information;

(ii) a comparison with a precision threshold; and/or (iii) a spatial relationship between the apparatus and the at least one other apparatus; and control the transmitter to transmit, after the deactivation of the sleep mode, the position information, the control of the transmitter to perform the transmission being performed conditional upon that the contribution indicator indicates that the position information is suitable to contribute to the determination of the position of at least one other apparatus.

22. A method, comprising:

monitoring, by a first apparatus of a system, a radio situation of a radio channel;

based on the situation identified from the monitoring, determining, by the first apparatus, a wakeup opportunity pattern for a second apparatus that is remote from the first apparatus, wherein the wakeup opportunity pattern that characterizes at least a plurality of time periods at which at least a receiver circuit of the second apparatus is awake; and transmitting, by the first apparatus, the wakeup opportunity pattern to the second apparatus;

receiving, by the second apparatus, the wakeup opportunity pattern characterizing the at least the plurality of time periods at which at least the receiver circuit of the second apparatus is awake;

monitoring, by the second apparatus, during at least one of the time periods a radio channel for a reception of a wakeup signal;

deactivating, by a component of the second apparatus, a sleep mode of the second apparatus, wherein the sleep mode is deactivated when the wakeup signal is received during the at least one time period;

obtaining, by the second apparatus and based on an evaluation of position information related to the second apparatus, a contribution indicator that indicates whether the position information is suitable to contribute to a determination of a position of at least one other apparatus, wherein the position information is considered suitable when the position information satisfies a predefined suitability criterion based on:

(i) a precision indicator characterizing an accuracy of the position information;

(ii) a comparison with a precision threshold; and/or (iii) a spatial relationship between the second apparatus and the at least one other apparatus; and transmitting, after the deactivation of the sleep mode, the position information, the transmitting being performed conditional upon that the contribution indicator indicates that the position information is suitable to contribute to the determination of the position of the at least one other apparatus.

23. A system comprising:

a first apparatus; and a second apparatus, the second apparatus comprising a receiver circuit, and each of the first and second apparatuses comprising:

a respective processor; and a respective transmitter;

wherein:

the processor of the first apparatus is configured to;

monitor a radio situation of a radio channel;

based on the situation identified from the monitoring, determine a wakeup opportunity pattern for a second apparatus that is remote from the first apparatus, the wakeup opportunity pattern characterizing at least a plurality of time periods at which at least the receiver circuit of the second apparatus is to be awake; and transmit, using the transmitter of the first apparatus, the wakeup opportunity pattern to the second apparatus; and the processor of the second apparatus is configured to:

receive the wakeup opportunity pattern characterizing the at least the plurality of time periods at which at least the receiver circuit of the second apparatus is awake;

monitor, during at least one of the time periods, a radio channel for a reception of a wakeup signal;

deactivate a sleep mode of the second apparatus, the sleep mode being deactivated when the wakeup signal is received during the at least one time period;

obtain, based on an evaluation of position information related to second apparatus, a contribution indicator that indicates whether the position information is suitable to contribute to a determination of a position of at least one other apparatus, the position information being considered suitable when the position information satisfies a predefined suitability criterion based on:

(i) a precision indicator characterizing an accuracy of the position information;

(ii) a comparison with a precision threshold; and/or (iii) a spatial relationship between the second apparatus and the at least one other apparatus; and after the deactivation of the sleep mode, activate the transmitter of the second apparatus to transmit the position information, the transmission of the position information being performed conditional upon that the contribution indicator indicates that the position information is suitable to contribute to the determination of the position of the at least one other apparatus.

* * * * *